June 17, 1947.                E. C. MILLIKEN                2,422,582
                           SPACER COLLAR AND PIPE
                             Filed July 17, 1945
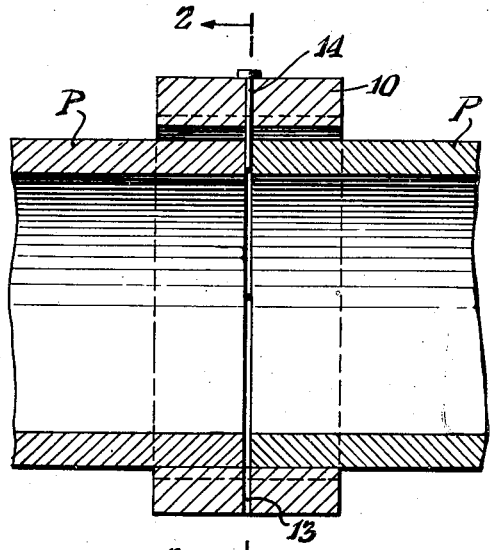
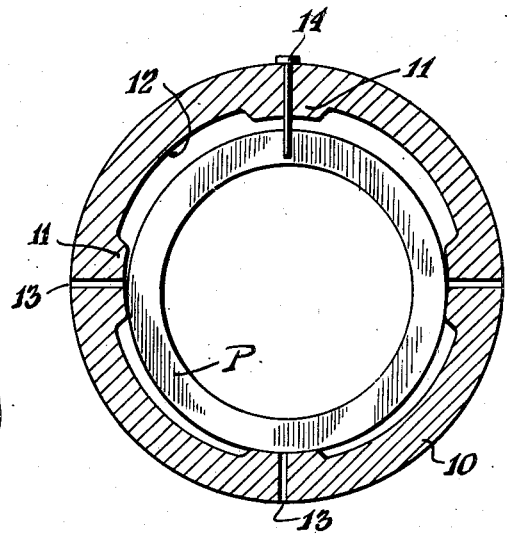
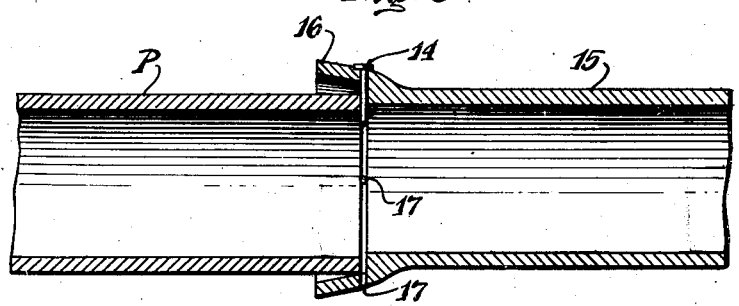
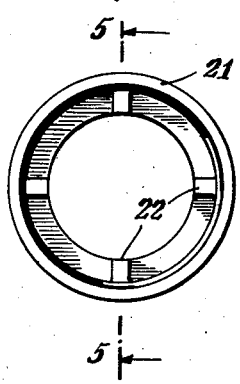
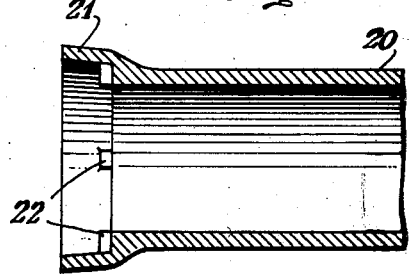
INVENTOR
Edward C. Milliken
BY Bohleber, Fasett + Montstream
ATTORNEYS Patented June 17, 1947

2,422,582

UNITED STATES PATENT OFFICE 2,422,582

SPACER COLLAR AND PIPE

Edward C. Milliken, Bowerston, Ohio, assignor to The Bowerston Shale Company, Bowerston, Ohio, a corporation of Ohio Application July 17, 1945, Serial No. 605,592

11 Claims. (Cl. 61—10)

1

The invention relates to a spacer collar for pipe such as drain pipe and to a pipe combination having a spacer collar. Such pipe may have holes therethrough and the joints between pipe connections may have spaces so that ground water will drain into the pipe which will then conduct it to a point of disposal. In order to secure drainage into the pipe the ends of the pipe should be spaced from each other to provide a drainage passage. The invention to be described herein assures such spacing in a simple and effective way.

It is an object of the invention to construct a collar for pipe by means of which the spacing between the ends of two pipes or the spacing between the end of a pipe having a socket or collar integral therewith in a simple and effective way.

It is another object of the invention to construct a pipe joining collar which may be separate from or integral with a pipe with a socket in the wall of the collar in which a spacer may be inserted which assures that a workman in laying the pipes centers the ends of the pipe within a separate collar and also assures that the end of the pipe is spaced from the end of its adjacent pipe.

A still further object is to construct a pipe having a collar integral therewith in which spacer means is provided within the collar for spacing the end of the pipe received therein from the bottom of the collar to provide drainage passages.

Other objects of the invention will be more apparent from the following description taken in connection with the accompanying drawings illustrating preferred embodiments of the invention, in which Figure 1 is a longitudinal sectional view through a spacer collar of the separate type and the ends of two pipes which ends are centered within the collar and spaced from each other.

Figure 2 is a cross sectional view of the spacer collar taken on line 2—2 of Figure 1.

Figure 3 is a longitudinal sectional view through two adjacent pipes, of the type having a collar integral with the pipe to form a bell mouthed end, constructed so that the end of the pipe must be spaced from the bottom of the socket.

Figure 4 is an end view of the bell mouthed or socket end of a pipe having spacer means at the bottom of the collar which is integral with the pipe.

Figure 5 is a longitudinal sectional view through the socket or collared end of the pipe of Figure 4 with the projections provided therein to assure drainage spaces into the pipe.

2

The invention is particularly applicable with baked clay drainage pipe, although the construction is equally applicable irrespective of what material is used for the pipe.

In the construction illustrated in Figure 1 the pipe sections are shown as being of uniform diameter although this is not essential and when laid, a collar 10 is provided having a bore 12 therethrough to receive and align the ends of the adjacent pipes and to hold the ends against displacement. This collar has ridges 11 within the bore preferably extending longitudinally so that drainage spaces or channels are assured between the inside wall of the collar and the outside wall of the pipe received therein. Since the collar is uniform axially without longitudinal obstructions engageable by a pipe end, it may be produced by extrusion and has no projections which are easily chipped or broken. It is evident too that the ridges may be provided upon the end of the pipe rather than within the collar. With this style of collar there is no assurance that a workman, laying a line of pipe, will center the collar with respect to the two ends of the pipe received therein with any degree of accuracy and furthermore there is no assurance that he will not leave the ends of the pipe abutting each other so that an insufficient drainage space between the ends of the pipes results.

In order to assure that a workman will center the collar with respect to the pipe ends and will leave an adequate drainage space between the ends of the pipe, the collar is provided with a socket which may be a perforation 13 through the side wall and preferably located centrally between the ends thereof. Several such sockets or perforations may be provided around the circumference of the collar. The socket or hole may or may not extend through a ridge as desired.

Spacer means 14 is projected into the socket or hole which spacer means is long enough to project beyond the inner wall of the collar and inwardly between the pipe ends. This spacer or spacer means may be a ten penny nail, or any other object for that matter and of any material. It may be of corroding or non-corroding material, and in the case of the former the hole in the collar when the spaced means has corroded away will eventually leave another drainage opening. The spacer means is intended primarily for assuring spacing of the pipe and centering thereof in the collar during the laying of the pipe since after the pipe is buried there is not ordinarily sufficient shifting of the pipe to vary the spacing initially provided therein.

In laying a line of pipe the workman lays one piece of pipe in the trench, inserts a spacer means through the hole in the collar and projects the collar on the end of the pipe, moving it axially until the end of the pipe engages the spacer means. The end of the second pipe is then inserted in the other end of the collar and moved axially until its end engages the spacer means. In this manner the workman knows that the collar is centered with respect to the two ends of the pipe and that sufficient spacing exists between the ends of the pipe for drainage. If desired the workman may lay a few lengths of pipe and withdraw the spacer or spacer means for use in laying additional lengths of pipe after he has advanced far enough away so that there is no possibility of the pipe shifting as the work proceeds. It is probably better practice, however, to leave the spacer in place so that the pipe cannot shift and close the space between the ends thereof during the filling in of the trench.

The construction is applicable to the bell mouthed pipe 15 shown in Figure 3. The collar 16 forming the bell mouth is integral with the end of the pipe. A socket is provided which may be a perforation or hole 17 extending through the wall of the collar at or adjacent the bottom thereof. A spacer or spacer means 14 such as a nail is inserted in the hole so that when the pipe is laid and the end of another pipe is inserted within the collar, the end engages the spacer means and assures that sufficient drainage space will be left between the end of the inserted pipe and the end of the bell mouthed pipe or the bottom of the collar. In this construction, of course, the spacer means does not have the function of centering such pipe ends as in the construction in which a separate collar is used.

Instead of providing an insertable spacer means the bell mouthed type of pipe 20, shown in Figures 3 and 4, may have ridges 21 projecting from the bottom of the collar 22 or from the end of the pipe which may be formed at the same time that the collar or bell is formed on the end of the pipe. Such ridges assure that sufficient drainage space is provided between the ends of the two pipes or between the end of one pipe and the bottom of the collar when the pipe end is inserted therewithin and its end abuts a ridge or ridges.

The invention is presented to fill a need for improvements in a spacer collar and pipe. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A pipe combination comprising a pipe, a collar carried upon the pipe having a bore free of longitudinal obstructions to pass the end of another pipe into the end thereof, and a socket carried by the collar adapted to receive spacer means extending into the bore against which the end of the other pipe may abut to keep the ends thereof spaced from each other to permit drainage therebetween.

2. A pipe combination comprising a pipe, a collar carried upon the pipe having a bore free of longitudinal obstruction to pass the end of another pipe into the end thereof, a socket carried by the collar spaced from the end thereof, and spacer means received by the socket and extending into the bore against which the end of the other pipe abuts to keep the end thereof spaced from each other to permit drainage therebetween.

3. A pipe combination comprising a pipe, a collar carried upon the pipe having a bore free of obstructions to pass the end of another pipe to the end thereof, a hole through the collar spaced from the end thereof, and spacer means insertable within the hole and projecting into the bore of the collar against which the end of the other pipe abuts to keep the ends thereof spaced from each other to permit drainage therebetween.

4. A spacer collar for pipe comprising a collar having a bore therethrough to receive the ends of two pipes which bore is free of longitudinal obstructions engageable by the pipe and a socket carried by a collar between the ends thereof adapted to receive a spacer means for centering the pipe within the collar and keeping the pipe ends separated.

5. A spacer collar for pipe comprising a collar having a bore therethrough which is free of longitudinal obstructions engageable by the pipe to receive the ends of two pipes, a socket carried by a collar between the ends thereof, and spacer means received in the socket and projecting into the bore of the collar for centering the pipes within the collar and keeping the pipe ends separated.

6. A spacer collar for pipe comprising a collar having a bore therethrough which is free of longitudinal obstructions engageable by the pipe to receive the ends of two pipes, ridges within the bore to engage the outer surface of the pipe and provide drainage passage between the pipe and the collar, and spacer means projecting inwardly within the collar between the ends thereof and inwardly of the ridges for centering the pipes within the collar and keeping the pipe ends separated.

7. A spacer collar for pipe comprising a collar having a bore therethrough which is free of longitudinal obstructions engageable by the pipe to receive the ends of two pipes, ridges within the bore to engage the outer surface of the pipe and provide drainage passage between the pipe and the collar, and a socket carried by a collar between the ends thereof to receive a spacer means for centering the pipes within the collar and keeping the pipe ends separated.

8. A spacer collar for pipe comprising a collar having a bore therethrough which is free of longitudinal obstructions engageable by the pipe to receive the ends of two pipes, ridges within the bore to engage the outer surface of the pipe and provide drainage passage between the pipe and the collar, a socket in the collar between the ends thereof, and a spacer means insertable within the socket for centering the pipes within the collar and keeping the pipe ends separated.

9. A spacer collar for pipe comprising a collar having a bore therethrough to receive the ends of two pipes which bore is free of longitudinal obstructions engageable by the pipe, ridges within the bore to engage the outer surface of the pipe and provide drainage passage between the pipe and the collar, a hole projected through the collar between the ends thereof, and a spacer means insertable within the hole for centering the pipes within the collar and keeping the pipe ends separated.

10. A pipe combination comprising a pipe, a collar integral with the end of the pipe and forming a shoulder of the end of the pipe, the collar having a bore adapted to receive the end of another pipe which bore is free of longitudinal obstructions engageable by the pipe, and a socket in the collar adjacent the shoulder adapted to receive a spacer means to keep the end of the inserted pipe spaced from the end of the pipe having the collar to permit drainage therebetween.

11. A pipe combination comprising a pipe, a collar integral with the end of the pipe and forming a shoulder of the end of the pipe, the collar having a bore which is free of longitudinal obstructions engageable by a pipe which bore is adapted to receive the end of another pipe, a socket in the collar adjacent the shoulder and spacer means received in the socket and projecting within the collar against which the end of the other pipe abuts to keep the end of the same spaced from the end of the pipe having the collar to permit drainage therebetween.

EDWARD C. MILLIKEN.

REFERENCES CITED

The following references are of record in the file of this patent:

UNITED STATES PATENTS

| Number | Name | Date |
|---|---|---|
| 2,029,920 | Gutman | Feb. 4, 1936 |
| 1,070,227 | Bonson | Aug. 12, 1913 |
| 1,103,391 | Aimsworth | July 14, 1914 |

FOREIGN PATENTS

| Number | Country | Date |
|---|---|---|
| 505,608 | Great Britain | 1939 |